United States Patent
Kumiya et al.

(10) Patent No.: US 7,283,661 B2
(45) Date of Patent: Oct. 16, 2007

(54) IMAGE PROCESSING APPARATUS

(75) Inventors: Hidetoshi Kumiya, Yamanashi (JP); Katsutoshi Takizawa, Tokyo (JP)

(73) Assignee: Fanuc Ltd, Yamanashi (JP)

( * ) Notice: Subject to any disclaimer, the term of this patent is extended or adjusted under 35 U.S.C. 154(b) by 720 days.

(21) Appl. No.: 10/833,003

(22) Filed: Apr. 28, 2004

(65) Prior Publication Data

US 2005/0002555 A1    Jan. 6, 2005

(30) Foreign Application Priority Data

May 12, 2003  (JP)  ............................. 2003-132962

(51) Int. Cl.
*G06K 9/00* (2006.01)
(52) U.S. Cl. ...................... 382/153; 382/154; 382/151
(58) Field of Classification Search ................ 382/153, 382/154, 151
See application file for complete search history.

(56) References Cited

U.S. PATENT DOCUMENTS 5,499,306 A * 3/1996 Sasaki et al. ............... 382/291
2003/0038801 A1* 2/2003 Terauchi et al. ............ 345/420

FOREIGN PATENT DOCUMENTS

| CN | 1054844 | 9/1991 |
|----|---------|--------|
| JP | 08-153198 | 6/1996 |
| JP | 09-128550 | 5/1997 |
| JP | 2000-288974 | 10/2000 |
| JP | 2003-039364 | 2/2003 |

OTHER PUBLICATIONS

First Notice of Examination Opinion (Office Action) in corresponding Chinese Patent Application No. 2004100380261 dated Jun. 16, 2006.

* cited by examiner

*Primary Examiner*—Matthew C. Bella
*Assistant Examiner*—Mike Rahmjoo
(74) *Attorney, Agent, or Firm*—Staas & Halsey LLP

(57) ABSTRACT

The entire region of variation in the viewing range of the attitude of a workpiece is divided roughly, and images of the workpiece are captured from each direction. The images are stored together with imaging direction data as a first teaching model. Images captured by varying the imaging direction at a narrow pitch within a predetermined range of attitude variation in the workpiece are then stored together with imaging direction data as a second teaching model. Images of the workpiece are captured and compared with the teaching models. The position and attitude of the workpiece are determined by the imaging direction and imaging position of the selected teaching model.

4 Claims, 5 Drawing Sheets

IMAGE PROCESSING APPARATUS

BACKGROUND OF THE INVENTION

1. Field of the Invention

The present invention relates to an image processing apparatus for detecting the position and attitude of an object. In particular, the present invention relates to an image processing apparatus for recognizing and detecting the attitude of randomly piled objects having an identical form, the positions and attitudes of which vary three-dimensionally.

2. Description of the Related Art

In automatic machines such as robots, a method of recognizing the position and attitude of an object (workpiece) which is not accurately positioned from a captured image of the object is typically employed to enable handling of the object. However, it is extremely difficult to recognize the position and attitude of an object that is capable of taking an arbitrary three-dimensional position and attitude, for example being piled up.

In the technology described in Japanese Unexamined Patent Application 2000-288974, a plurality of images of an object captured from various directions are stored in advance as teaching model images, whereupon the stored teaching model images are compared with an input image captured upon detection of the position and attitude of the object in order to select the teaching model which most closely resembles the captured image. The position and attitude of the object are then determined on the basis of the selected teaching model. Then, on the basis of the determined position and attitude of the object, a visual sensor is caused to move to the position and attitude at which the object is to be recognized, and thus the position and attitude of the object are recognized accurately using this visual sensor.

In the technology described in Japanese Unexamined Patent Application H8-153198, an image cutting recognition apparatus is constituted by an object learning apparatus and an object recognition apparatus. In the object learning apparatus, the region of an object is extracted from image data obtained by capturing images of the object from various directions using first image input means, and image processing data are obtained by normalizing the image data value of the extracted object region. By modifying the size of the image processing data in various ways, a learned image data set is obtained. The form of a manifold is then calculated from the learned image data set and characteristic vectors determined from the learned image data set. Meanwhile, in the object recognition apparatus, the region of the object is extracted from image data obtained using second image input means, whereupon a distance value is calculated from data obtained by normalizing the image data value of the extracted region, the aforementioned characteristic vectors, and the aforementioned manifold form, and thus the position, direction, and magnitude of the object are outputted.

The technology described in the Japanese Unexamined Patent Application 2000-288974 is applied in particular to an operation to pick up randomly piled objects of the same shape one by one. In this case, a plurality of teaching model images is determined by capturing images of the objects from various directions. The teaching model images are then compared to input images obtained by capturing images of several of the piled objects, whereupon the teaching model image which most closely resembles the captured image is selected. The selected teaching model is then used to determine the three-dimensional position and attitude of the object. Then, on the basis of the determined three-dimensional position and attitude of the object, a visual sensor is moved to the position and attitude at which the object is to be recognized, and the position and attitude of the object are recognized accurately by the visual sensor. In this technology, the position and attitude of the object can be recognized with greater accuracy as the number of teaching models is increased.

When a large number of objects are piled up as in the case described above, the individual objects take various three-dimensional attitudes. To recognize the position and attitude of such objects with even greater accuracy, more (more detailed) teaching model images need to be prepared in accordance with the possible attitudes of the objects.

However, obtaining a large number of teaching model images requires time and larger storage means for storing the teaching model images. A further problem arises in that when attempts are made to recognize the position and attitude of an object, comparison with the teaching model images takes time due to the large number of teaching model images.

SUMMARY OF THE INVENTION

An image processing apparatus according to the present invention recognizes the attitude of an object by means of a comparison between an input image of the object captured by imaging means and a teaching model of the object. The image processing apparatus comprises a first teaching model constituted by direction data obtained when images of the object are captured from a plurality of directions so as to cover discretely the entire range of views that the object is able to take, and captured images corresponding to the direction data; a second teaching model constituted by direction data obtained when images of the object are captured from a plurality of directions, covering only a partial range of the views that the object is able to take at a narrower directional variation pitch than that of the first teaching model, and captured images corresponding to the direction data; first comparing means for comparing a first input image of the object captured by the imaging means with each image of the first teaching model; relative position and attitude modifying means of the imaging means for modifying the position and attitude of the object relative to the imaging means on the basis of the comparison result of the first comparing means so as to enter the range of views of the second teaching model; and second comparing means for comparing a second input image captured by the imaging means of the object in the modified relative position and attitude thereof, using the second teaching model.

In this image processing apparatus, the relative position and attitude modifying means may be constituted as a robot. The comparison by the first and second comparison means may be performed by matching. The comparison by the first and second comparing means may also be performed by comparing intermediate images produced by orthogonal transformation of the input image and multiple view images.

According to the present invention, an image processing apparatus which is capable of recognizing the attitude of an object in a wide range and with high precision using a small number of teaching models is provided.

BRIEF DESCRIPTION OF THE DRAWINGS

The aforementioned and other objects and features of the present invention will be clarified in the following description of the preferred embodiments with reference to the attached drawings. In these drawings.

DESCRIPTION OF THE PREFERRED EMBODIMENTS

Figure 1:
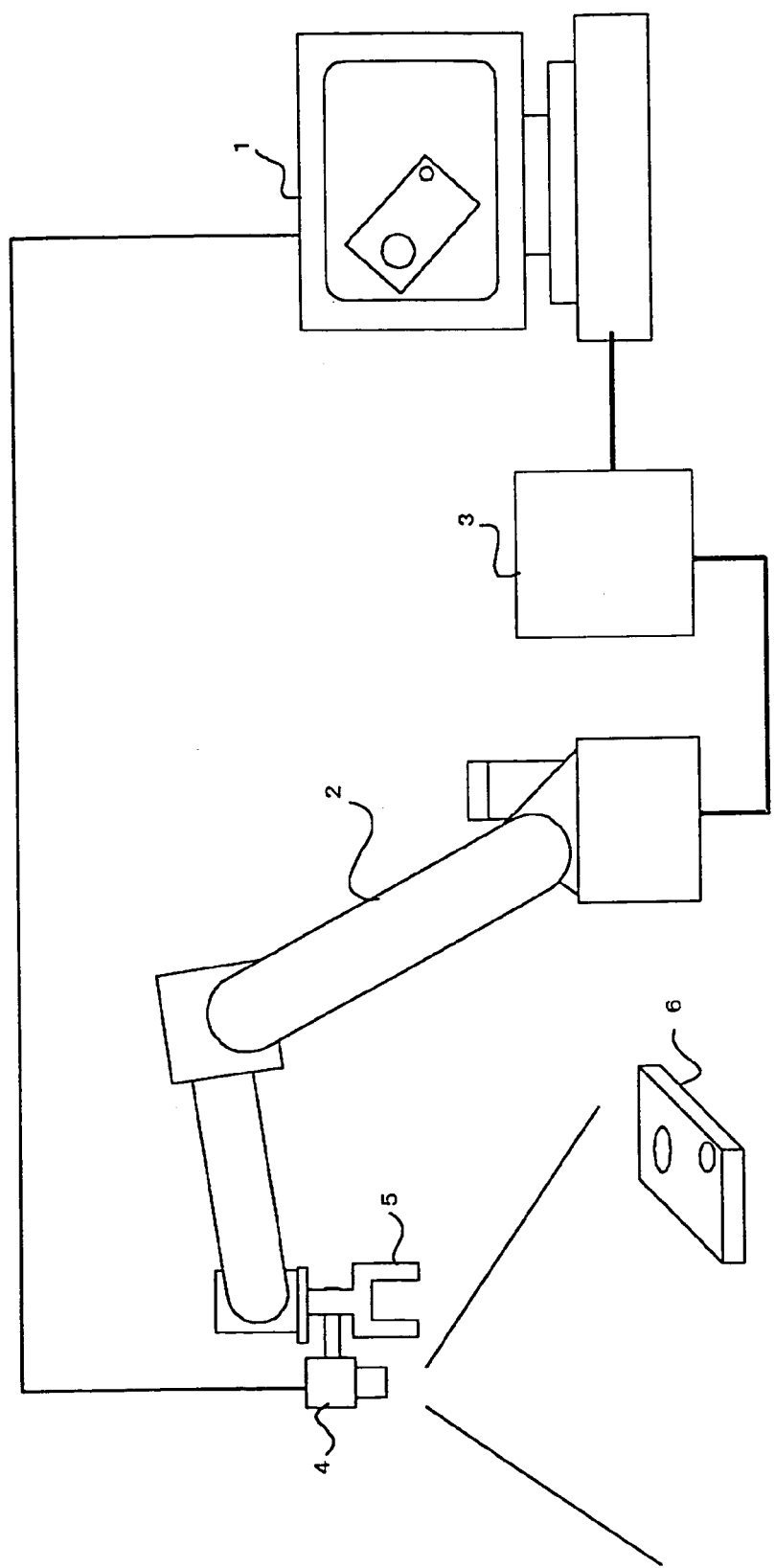
FIG. 1 is a block diagram of a robot system to which an image processing apparatus according to the present invention is applied.

FIG. 1 is a system diagram of a robot system to which an image processing apparatus according to an embodiment of the present invention is applied.

A robot controller 3 and an image processing apparatus 1 are connected via a communication interface. A camera 4 (imaging means) for capturing images of an object (workpiece 6) is mounted on the arm tip of a robot main body 2, the camera 4 and image processing apparatus 1 being connected by a signal wire so that images captured by the camera 4 are inputted into the image processing apparatus 1.

The robot controller 3 and image processing apparatus 1 implement the entire system operation while transmitting and receiving information to and from each other synchronously. In relation to the present invention, the robot controller 3 transmits the current position of the robot, which is learned by the robot controller 3, to the image processing apparatus 1, and outputs an imaging command to the image processing apparatus 1. Meanwhile, the image processing apparatus 1 receives the imaging command from the robot controller 3 and captures an image of the workpiece 6 using the camera 4. Further, the image processing apparatus 1 transmits a target operating position of the robot, determined by the image processing apparatus 1, to the robot controller 3. Meanwhile, the robot controller 3 controls driving sources such as servomotors which drive the various functional portions of the robot main body 2 in order to position the robot main body 2 in the target operating position. Note that the numeral 5 in FIG. 1 indicates a hand attached to the arm tip of the robot.

Figure 2:
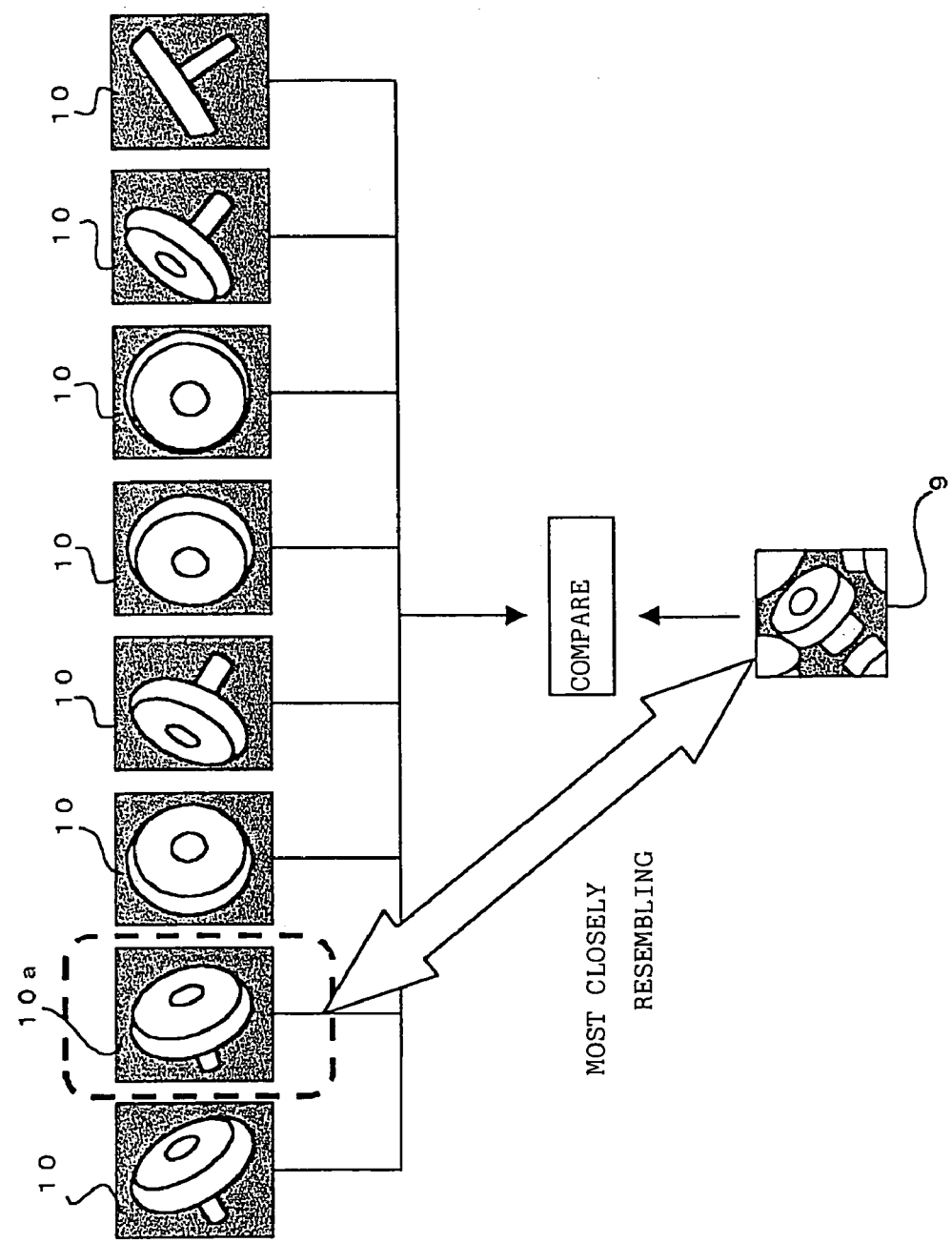
FIG. 2 is an illustrative view of a method for recognizing position and attitude by comparing a captured image and a teaching model.

FIG. 2 is a view illustrating a method of recognizing the position and attitude of the workpiece 6 by comparing a plurality of teaching model images obtained by capturing images of the workpiece 6 from a plurality of different directions with an inputted image captured by the camera 4.

First, images of the workpiece subject to position and attitude recognition are captured from various directions. Each image is then related to data regarding the imaging direction at the time of image capture and stored in the image processing apparatus 1 as a first teaching model. In the example shown in FIG. 2, images of the workpiece are captured from eight different directions, and the resulting images 10 . . . are stored as the teaching model images. Then, in order to recognize the respective three-dimensional positions and attitudes of the workpieces 6 when piled up into various attitudes, a captured and inputted image 9 of the workpiece 6 is compared respectively with the eight teaching model images, whereupon the teaching model which most closely resembles the input image 9 is selected.

Conventional methods employed in this comparison include matching according to the correlation between the brightness of the images and a method in which orthogonal transformation is performed by means of Fourier transform, discrete cosine transform or similar and the degree of resemblance is calculated as a distance within a subspace by comparing the orthogonally transformed intermediate images with each other. By performing this orthogonal transformation, the data dimension can be reduced in comparison with a case in which a direct correlation calculation is performed on the images, and as a result, the calculation load involved in the comparison of similar images can be reduced.

FIG. 2 shows as example in which as a result of the comparison, a teaching model 10a is selected as the teaching model most closely resembling the input image 9 from among the eight teaching models 10 . . . .

As disclosed in the aforementioned Japanese Unexamined Patent Application 2000-288974 and so on, such comparison of a teaching model image with an input image is performed conventionally. In the present invention, however, this comparison differs in being performed in two stages.

Figure 3:
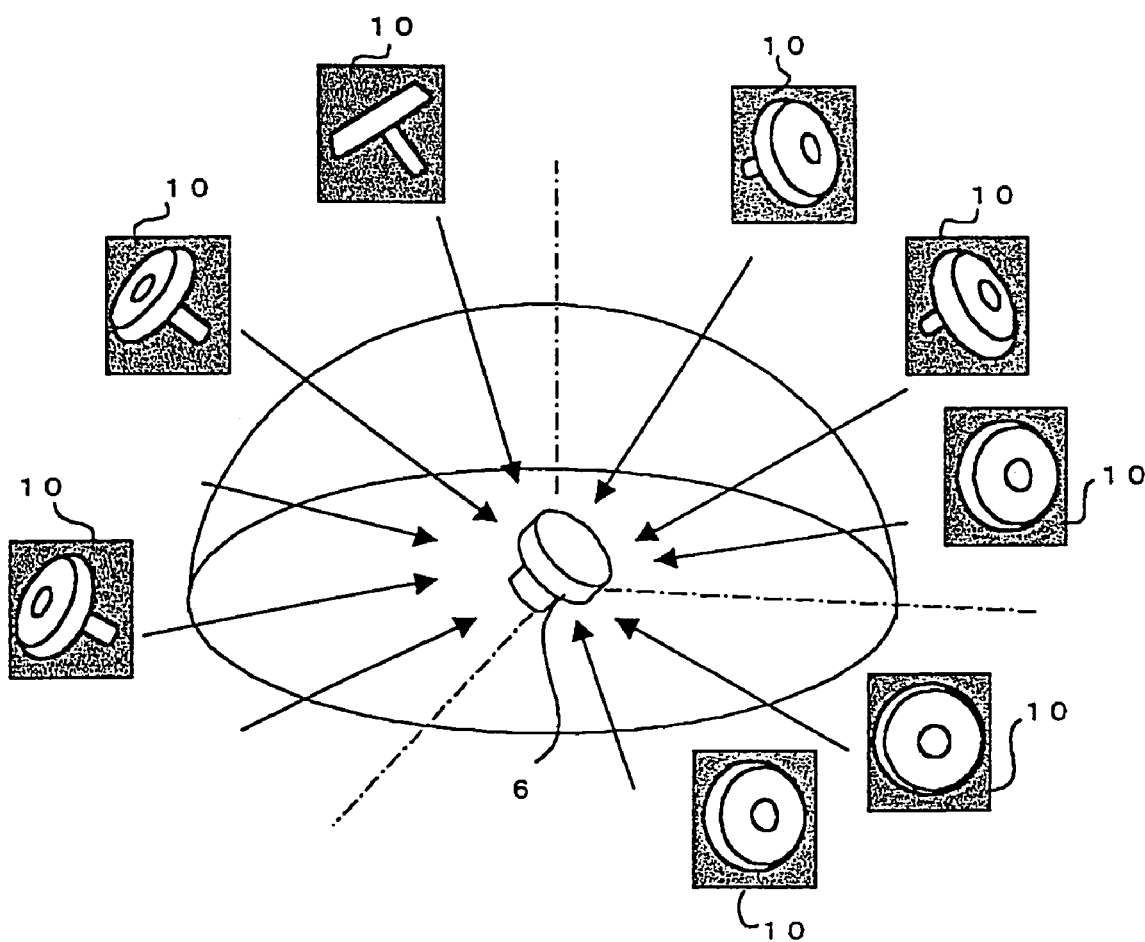
FIG. 3 is an illustrative view of a method for obtaining images of a first teaching model using the robot system of FIG. 1 in order to implement a first stage of the comparison between the captured image and teaching model.

FIG. 3 is an illustrative view of a method of obtaining the various images of the first teaching model in order to perform a first stage of the comparison.

The various teaching model images used to perform the first stage of the comparison are obtained by capturing images of a workpiece from different directions in order to cover the entire region of variation in the view of the workpiece to be recognized, resulting from variation in the attitude of the workpiece. For this purpose, either images of the workpiece 6 are captured while varying the sight line direction of the camera 4 that is mounted on the arm tip of the robot main body 2, or a plurality of images are captured by fixing the camera and varying the attitude of the workpiece 6 to alter the attitude of the workpiece 6 relative to the camera 4, thus dividing the entire region of the attitudes that can possibly be taken by the workpiece 6.

For example, as shown in FIG. 3, images of the workpiece 6 are captured while varying the position of the camera 4 or the attitude of the workpiece 6 in various direction at a directional angle pitch of between 30 and 45 degrees from the reference coordinates at which the workpiece 6 is placed, whereupon the captured images are stored in storage means within the image processing apparatus 1 as the various images of the first teaching model. At this time, the imaging directions of the camera 4 relative to the imaged workpiece 6 are related to the captured images and stored in the storage means within the image processing apparatus 1 as teaching data of the first teaching model.

Further, second teaching model images are obtained for a second stage of the comparison, and these images are stored in storage means within the image processing apparatus 1. These second teaching model images are obtained by varying the imaging direction of the camera 4 relative to the workpiece 6 at a narrower pitch than the variation pitch of the imaging direction in the first teaching model within only a partial range of the viewing region of the workpiece 6.

Figure 4:
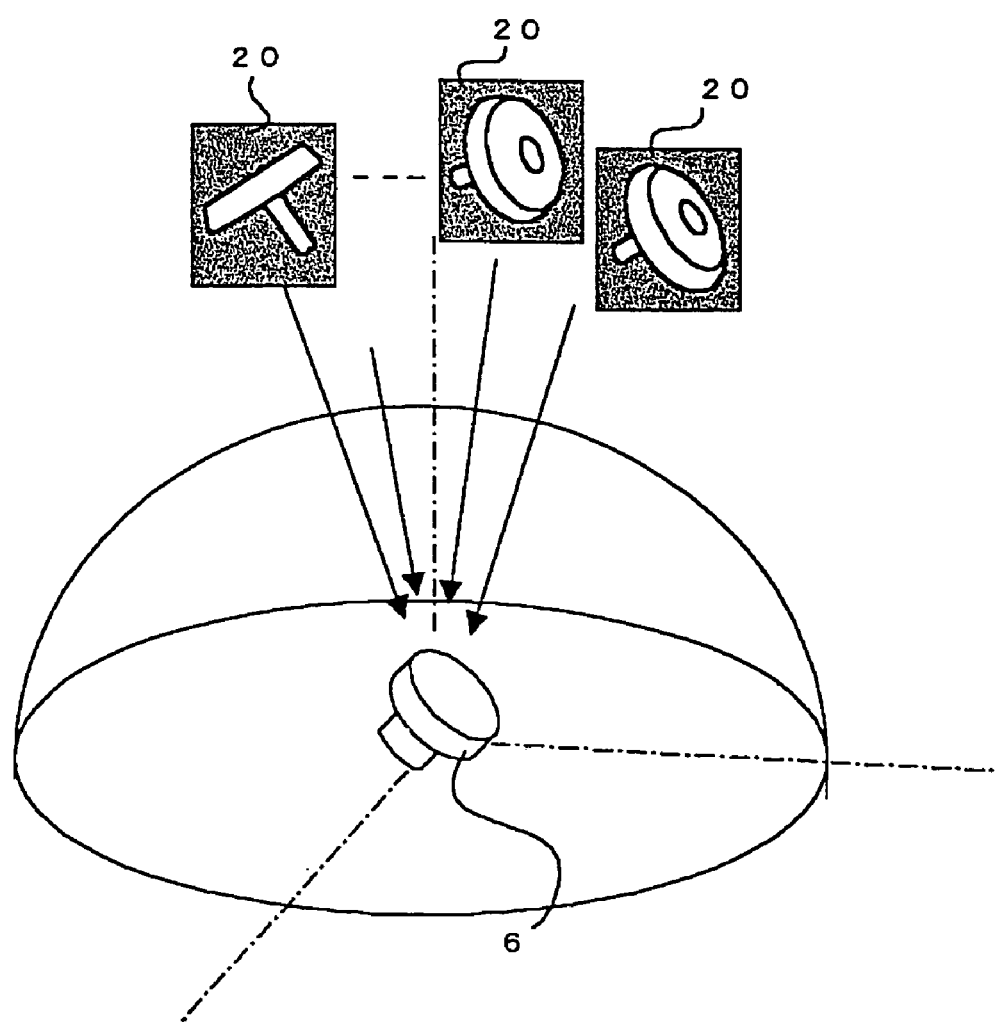
FIG. 4 is an illustrative view of a method for obtaining images of a second teaching model using the robot system of FIG. 1 in order to implement a second stage of the comparison between the captured image and teaching model.

For example, as shown in FIG. 4, images are captured by varying the imaging direction every 10 degrees only within a range of ±30 degrees formed by the optical axis of the imaging camera with respect to the vertical direction (Z axis direction), whereupon the captured images 20 are related to the corresponding imaging direction data and they are stored in storage means within the image processing apparatus 1 as the second teaching model.

Figure 5:
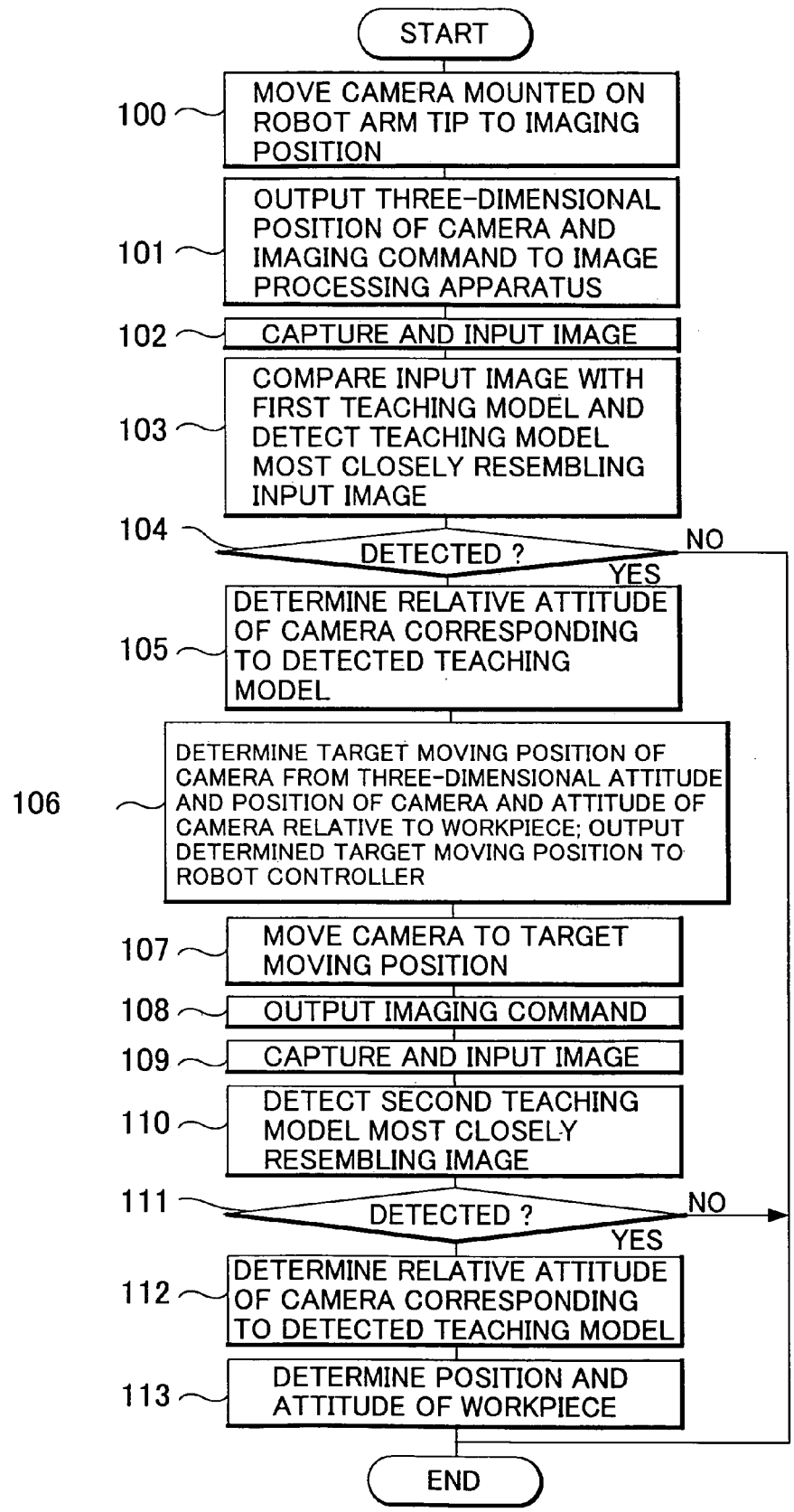
FIG. 5 is a flowchart of processing for determining the position and attitude of a workpiece using the robot system of FIG. 1.

FIG. 5 is a flowchart of processing for determining the position and attitude of a workpiece using the robot system of this embodiment.

First, the robot controller 3 drives various axles of the robot main body 2 to move the camera 4 mounted on the arm tip of the robot into an imaging position in relation to a pile of workpieces subject to three-dimensional position and attitude recognition (step 100). Then, the three-dimensional position of the camera is transmitted to the image processing apparatus together with an imaging command (step 101).

A processor of the image processing apparatus 1 stores the three-dimensional position of the camera 4 transmitted from the robot controller 3, and upon reception of the imaging command, uses the camera 4 to capture an image of the workpiece 6, whereupon this image (first input image) is inputted (step 102). A comparison of the input image and the various teaching model images of the first teaching model stored in the storage means is then performed by means of matching or the like. Since details of the processing involved in this comparison are disclosed in detail in the aforementioned Japanese Unexamined Patent Application 2000-288974 and are known universally, a detailed description thereof has been omitted.

A determination is made as to whether or not one of the first teaching model images resembles the input image (step 104), and if no similar image exists, the processing ends. If a similar image exists, the teaching model which most closely resembles the input image is selected. The attitude of the camera 4 relative to the workpiece 6 is determined from the imaging direction of the camera in relation to the workpiece 6, which is stored in the selected teaching model (step 105). A target moving position of the camera 4 is then determined from the three-dimensional position of the camera 4 (the current position of the robot) stored in the step 101 and the attitude of the camera relative to the workpiece determined in the step 105, whereupon this target moving position is outputted to the robot controller 3 (step 106). The target moving position of the camera 4 is a target position to which the camera 4 is moved relative to the workpiece in order to cause the camera 4 to input an image to be used in the second stage of the comparison with the second teaching model.

The robot controller 3 drives the various axles of the robot main body to move the camera 4 mounted on the arm tip of the robot to the received target moving position (step 107). An imaging command is then outputted to the image processing apparatus 1 (step 108).

The image processing apparatus 1 receives the imaging command and captures an image (second input image) of the workpiece 6 using the camera 4 (step 109). The obtained image is compared with each of the second teaching model images in a similar fashion to the comparison with the first teaching model images, and a similar teaching model is selected. When a teaching model with a degree of similarity at or above a predetermined level cannot be detected within the second teaching model, the processing ends. On the other hand, when detected that such a similar teaching model exists, the teaching model most closely resembling the image is selected (steps 110, 111).

The attitude of the camera 4 relative to the workpiece 6 is determined from the imaging direction of the camera 4 in relation to the workpiece that is stored in the selected teaching model (step 112). The position and attitude of the workpiece 6 are determined from the determined relative attitude of the camera 4 and the current three-dimensional position of the camera 4 (the target moving position determined in the step 106) (step 113).

As described above, the attitude of the workpiece 6 is determined from a rough division thereof on the basis of the first teaching model, whereupon the camera 4 is moved in accordance with the determined workpiece attitude and position to a predetermined position and attitude within a predetermined range of the view of the workpiece 6 for capturing an image to be used in the comparison with the second teaching model. An image is then inputted and the inputted image is compared with the various images of the second teaching model, in which the attitude of the workpiece 6 is stored at a narrow pitch, and thus the position and attitude of the workpiece 6 is determined. By means of this process, the position and attitude of the workpiece 6 can be determined with a high degree of precision from a small number of teaching models.

Once the position and attitude of the workpiece has been recognized precisely in this manner, handling processing such as grasping the recognized workpiece 6 by the hand 5 and picking the workpiece 6 up is performed.

According to the present invention as described above, the attitude of a workpiece can be recognized with a high degree of precision from a small number of teaching models.

What is claimed is:

1. An image processing apparatus for recognizing at least the attitude of an object by comparing an input image of said object captured by imaging means with a teaching model of said object, comprising:
   a first teaching model constituted by direction data obtained when images of said object are captured from a plurality of directions so as to cover discretely the entire range of views that said object is able to take, and captured images corresponding to said direction data;
   a second teaching model constituted by direction data obtained when images of said object are captured from a plurality of directions, covering only a partial range of the views that said object is able to take at a narrower directional variation pitch than that of said first teaching model, and captured images corresponding to said direction data;
   first comparing means for comparing a first input image of said object captured by said imaging means with each image of said first teaching model;
   relative position and attitude modifying means of said imaging means for modifying the position and attitude of said object relative to said imaging means on the basis of the comparison result of said first comparing means so as to enter the range of views of said second teaching model; and
   second comparing means for comparing a second input image of said object captured by said imaging means in the modified relative position and attitude thereof, using said second teaching model.

2. The image processing apparatus according to claim 1, wherein said relative position and attitude modifying means are constituted by a robot.

3. The image processing apparatus according to claim 1, wherein the comparison by said first and second comparing means is performed by matching.

4. The image processing apparatus according to claim 1, wherein the comparison by said first and second comparing means is performed by comparing intermediate images produced by orthogonal transformation of said input image and said multiple view images.

* * * * *